US007469226B2

(12) United States Patent
Escher

(10) Patent No.: US 7,469,226 B2
(45) Date of Patent: Dec. 23, 2008

(54) METHOD OF PROVIDING A FINANCIAL EVENT IDENTIFICATION SERVICE

(75) Inventor: Richard E. A. Escher, Ottawa (CA)

(73) Assignee: Recognia Incorporated, Ottawa, Ontario (CA)

( * ) Notice: Subject to any disclaimer, the term of this patent is extended or adjusted under 35 U.S.C. 154(b) by 1256 days.

(21) Appl. No.: 10/316,031

(22) Filed: Dec. 11, 2002

(65) Prior Publication Data

US 2003/0110124 A1    Jun. 12, 2003

Related U.S. Application Data

(60) Provisional application No. 60/338,645, filed on Dec. 11, 2001.

(51) Int. Cl.
*G06Q 40/00*    (2006.01)
(52) U.S. Cl. .................................................. 705/36 R
(58) Field of Classification Search ........................ None
See application file for complete search history.

(56) References Cited

U.S. PATENT DOCUMENTS 5,321,613 A * 6/1994 Porter et al. .................. 702/1
6,012,042 A * 1/2000 Black et al. ............... 705/36 R
6,105,012 A * 8/2000 Chang et al. .................. 705/64
6,351,747 B1 * 2/2002 Urazov et al. ................ 707/10
2002/0004774 A1 * 1/2002 Defarlo ....................... 705/36

OTHER PUBLICATIONS

Buried treasure. Brethenoux, Erik. CIO. Framinghouse: Oct. 1, 1995. vol. 10, Iss. 1; p. 38 (3 pages).*
"copious." The American Heritage® Dictionary of the English Language, Fourth Edition. Houghton Mifflin Company, 2004. Jul. 30, 2007. <Dictionary.com http://dictionary.reference.com/browse/copious>.*
"concomitant." The American Heritage® Dictionary of the English Language, Fourth Edition. Houghton Mifflin Company, 2004. Jul. 26, 2007. <Dictionary.com http://dictionary.reference.com/browse/concomitant>.*

* cited by examiner

*Primary Examiner*—Hani Kazimi
*Assistant Examiner*—Olabode Akintola
(74) *Attorney, Agent, or Firm*—Anne Kinsman; Borden Ladner Gervais LLP

(57) ABSTRACT

A method of providing a financial event identification service using a database of fundamental event data or technical event data comprises: receiving a request for fundamental event data or technical event data from a from a client application; querying the database based on the request and client application specific selection criteria to obtain suitable fundamental event data or technical event data; and transmitting the fundamental event data or technical event data to the client application.

18 Claims, 14 Drawing Sheets

METHOD OF PROVIDING A FINANCIAL EVENT IDENTIFICATION SERVICE

The present application claims priority from U.S. Provisional Patent Application No. 60/338,645, filed Dec. 11, 2001.

FIELD OF THE INVENTION

The present invention relates to financial analysis and particularly to providing a technical event identification service.

BACKGROUND OF THE INVENTION

Fundamental analysis and technical analysis are two generally accepted disciplines of financial Analysis that are used to make trading and investment decisions about publicly traded companies. Fundamental analysis considers the company, its management, marketing activities, sales prospects, supply and demand and other economic factors to estimate the value of the company. This estimate is compared to the company's current stock price on the public markets to determine whether a trade or investment should be made. Technical analysis, on the other hand, only considers the price and volume history of the company and places less emphasis on accounting and economic factors. The historical price and volume behaviour is used to make an assessment of the most likely price in the future. This discipline originated with Charles Dow in the late 1800's and early 1900's.

Both analysis techniques are largely manual due to the subjective nature of the interpretation of the data. The underlying data itself may be factual, for example, an income statement or price charts, yet different people often interpret that data in vastly different ways.

A number of terms of art are used in the present specification. An inbound trend is a series of higher highs or lower lows that lead into a price pattern. An indicator is a calculation based on stock price and/or volume that produces a number in the same unit as price. An example of an indicator is the moving average of a stock price. An oscillator is a calculation based on stock price and/or volume that produces a number within a range. An example of an oscillator is the Relative Strength Index (RSI). A price chart is a graph of a company's share price (Y-axis) plotted against units of time (X-axis).

The terms technical event, and fundamental event are coined terms to denote points such as the price crossing the moving average or the RSI crossing threshold values such as the 30-line or the 70-line. The technical event or fundamental event occurs at a specific point in time. The importance of most indicators and most oscillators can be represented as technical events. A technical event, as used herein, is the point in time where a stock price has interacted (e.g. crossed or bounced) with an indicator or confirmed a price pattern, e.g. by breaking the neckline of a head and shoulder pattern, or an oscillator has crossed a threshold. There are other techniques that technical analysts use to interpret price history as well that can be represented as technical events. These, however, are more subjective and involve the subjective recognition of price formations or price patterns. Fundamental events are the point in time where a stock price has interacted (e.g. crossed or bounced) with a price value computed from company accounting and/or other economic data. The expression financial event includes both fundamental events and technical events. The expression technical event data refers to technical events and associated characteristics. Similarly, the expressions financial event data and fundamental event data refer to financial events and associated characteristics and fundamental events and associated characteristics, respectively.

A price formation, price pattern or chart pattern is a pattern that indicates changes in the supply and demand for a stock cause prices to rise and fall. Over periods of time, these changes often cause visual patterns to appear in price charts. Predictable price movements often occur following price patterns. A reversal pattern is a type of price pattern that is believed to indicate a change in the direction of a price trend. If prices are trending down then a reversal pattern will be bullish since its appearance is believed to indicate prices will move higher. Examples of bullish reversal patterns include double bottoms and head and shoulder bottoms. Similarly, if prices are trending up then a reversal pattern will be bearish. Examples of bearish reversal patterns include double tops and head and shoulder tops. Data fusion is a process by which a conclusion can be inferred from multiple, diverse data sources.

The present invention applies to both the fundamental and technical methods of analysis but the system is described here in detail for technical analysis. Technical analysts, or technicians, place significant value on price charts. Over the years technicians have developed various calculations that aid in their interpretation of the price behaviour that is shown on price charts. For example, they will often look at where a stock's price is relative to its 10-day or 50-day moving average. The choice of using 10 days or 50 days, or other periods, for the basis of the moving average is personal and influenced by whether they are considering long-term or short-term trades. The following table illustrates how a 10-day moving average is calculated—it is the sum of the last 10 prices divided by 10. A 50-day moving average would be the sum of the last 50 prices divided by 50.

TABLE 1

10-Day Moving Averages

| Price | Sum of Last 10 Prices | 10-Day Moving Average of Price |
| --- | --- | --- |
| 63.00 | 653 | 65.3 |
| 97.00 | 590 | 59.0 |
| 69.00 | 528 | 52.8 |
| 28.00 | 511 | 51.1 |
| 68.00 | 490 | 49.0 |
| 42.00 | 518 | 51.8 |
| 85.00 | 566 | 56.6 |
| 14.00 | 483 | 48.3 |
| 94.00 | 547 | 54.7 |
| 93.00 | 465 | 46.5 |
| 0.00 | 388 | 38.8 |
| 35.00 | n/a | n/a |
| 52.00 | n/a | n/a |
| 7.00 | n/a | n/a |
| 96.00 | n/a | n/a |
| 90.00 | n/a | n/a |
| 2.00 | n/a | n/a |
| 78.00 | n/a | n/a |
| 12.00 | n/a | n/a |
| 16.00 | n/a | n/a |

In the language of technical analysis, a moving average falls into the class of calculations knows as "indicators". There are many other types of indicators but they are all calculated from historical prices and volumes. The result of an indicator calculation has the unit of a price.

There is another class of calculation that is used by technical analysts that is known as an oscillator. The result of an oscillator calculation is not a price but rather a number that is constrained to fall within a range such as 0 to 100, or −1 to +1 or some other range as may be deemed to be significant by the technician. An example of an oscillator is the RSI oscillator. FIG. 1 shows an example of an RSI oscillator. Note the vertical axis for the RSI ranges from 0 to 100 but only the range 20 to 80 is shown in the figure. The RSI typically generates a buy signal when the price crosses above the 30-line and a sell signal when it crosses below the 70-line.

There are a large number of desktop software applications and websites that cater to technical analysts. The purpose of these tools is to help the technician with the mechanical task of plotting the charts and calculating indicators and oscillators that help them in their interpretation of the price history. For example, the website http://www.prophet.net is consistently ranked as one of the best websites for technical analysis tools. This site provides several hundred indicators and oscillators that can be drawn on price charts. However, the site does not provide any form of interpretation of the information. Thus, it remains necessary for the technical analyst to review each chart manually to identify charts that are showing events of interest that may identify trading opportunities.

When interpreting a price chart, a technician will often look at where the price is relative to an indicator or where an oscillator is relative to some benchmark. For example, if the price of a security is significantly higher than its moving average Technicians will look for the price to fall back towards the moving average and if the price is significantly lower than the moving average they will look for it to rise up towards the moving average. Of most interest to a technician are charts where the price of a stock has just crossed the moving average. If the price crosses up above the moving average then they will look for the stock price to continue rising. If the price crosses down below the moving average they will look for the price to fall.

Similarly, with a RSI oscillator, for example, Technicians look for securities that have just crossed the 30 or 70 thresholds. If the RSI has just moved up across the 30-line it is said to be a buy signal. If it crosses below the 70-line is it considered a sell signal.

FIG. 2 is a price chart for CBRL Group (NASDAQ symbol CRBL) that is showing a price formation or price pattern called a head and shoulder bottom. The head and shoulder bottom pattern appears in the lower right of the graph spanning the period September through November, and centred on October. The technical event is said to occur at the point in time where the neckline is pierced. In FIG. 2 this occurs in late November.

FIG. 3 shows the same price chart produced annotated according to a commonly assigned method, and described in U.S. Provisional Patent Application No. 60/339,774, filed Dec. 17, 2001, the contents of which are incorporated herein by reference, with the price pattern, neckline and inbound trend all annotated. The inbound trend is marked because technical analysts consider head and shoulder bottom patterns to be reversal patterns and, hence, the existence of a downward trend is necessary so that there is a series of price moves for the pattern to reverse. As can be seen with the annotation, the pattern terminates when the neckline is broken. This event, the price crossing above the neckline, is said to confirm the pattern and it is at this point that a trading action is generally taken.

Traders that use technical analysis continually scan charts like those shown in FIGS. 2 and 3 searching for price pattern confirmations and other technical events. However, the pattern-confirmation technique is under-used since trained analysts are able to study only a relatively small number of charts relative to the number of securities and commodities trading.

It is quite impossible for technical analysts to monitor all intra-day price movements to identify price patterns forming over periods of minutes or hours in all the stocks that are trading. The best technical trading opportunities are achieved by combining the technical events that arise from the identification of price patterns with the technical events that arise from indicators and oscillators. The technique can be improved by combining it with fundamental events derived from analysis of fundamental accounting and economic data. The ability to combine these events together has not been possible because it has not been possible to automatically identify, characterize and annotate the price patterns.

The poor quality of prior art recognition services, and their inability identify the inbound trend and characterize a pattern has made it impossible to produce valid technical events for patterns. Attempts have been made to automate the identification of price patterns but they have not been successful for several reasons:

the recognition problem is non-trivial and attempts to automate the process have not worked well;

conventional neural net recognition algorithms are unable to characterize the patterns so the geometric properties of the price patterns have not been known;

detailed characterization of the patterns is necessary to search and filter through the large number of patterns that continually appear to select patterns that appeal to the particular needs of each analyst;

without proper characterization of the price patterns it is not possible to properly formulate the technical event;

conventional neural net recognition algorithms are unable to generate the markup required to annotate the patterns on price charts;

the cost of using trained human analysts to manually scan all of the securities trading on any given stock or commodity exchange and identify and annotate patterns is slow and expensive; and the effectiveness of a price pattern diminishes rapidly and it is expensive to disseminate the information quickly to large numbers of people.

It is, therefore, desirable to provide automated detection of technical and fundamental events to enable a system to emulate a full-service brokerage model, which uses human brokers to contact investors to promote trading and offer investment advice and guidance. In the full-service brokerage model, human analysts generate buy/sell recommendations and the brokers then contact customers and advise them to enter and exit positions as appropriate. Distributing technical and fundamental event data over the Internet to sites that serve end-user investors and traders can fulfill the same objective as human brokers in notifying customers to trading opportunities. The signals derived from technical and fundamental events will grow in sophistication over time and, with knowledge of an individual investors portfolio and trading styles, signals can be tailored to provide trading advice and guidance. Existing publicly available price charting technology distributed over a network exists in rudimentary form. However, a significant drawback of such systems is that they do not reliably recognize patterns. Furthermore, they do not identify technical events based on those patterns. It is desirable to improve the selection of signals to distinguish "tradable information" over noise. It is also desirable to automate tedious analytical tasks associated with technical analysis commonly performed manually and provide these results to many clients over a distributed network.

SUMMARY OF THE INVENTION

It is an object of the present invention to obviate or mitigate at least one disadvantage of previous methods associated with known methods of providing technical event information.

In a first aspect, the present invention provides A method of providing a financial event identification service using a database of financial event data comprising: making available to a client a subset of the financial event data based on a client profile; receiving a request from a client for financial event data; formulating the request as a query against the subset to obtain financial event data results; and transmitting the financial event data results to the client. The client can be a financial service provider, or an end user. Data fusion can be used to formulate the data. The financial data results are typically provided in a format suitable for transmission to the client, such as HTML, XML and SOAP.

The present invention also provides a system of for providing a financial event identification service using a database of financial event data comprising: means for making available to a client a subset of the financial event data based on a client profile; means for receiving a request from a client for financial event data; means for formulating the request as a query against the subset to obtain financial event data results; and means for transmitting the financial event data results to the client.

In a further aspect, the present invention provides a method of providing a financial event identification service using a database of financial event data comprising: receiving a request for financial event data from a from a client application; querying the database based on the request and client application specific selection criteria to obtain suitable financial event data results or technical event data results; and transmitting the financial event data results or technical event data results to the client application.

In yet another aspect, the present invention provides a method of providing a financial event identification service using a database of financial event data comprising: receiving a request for financial event data from a from a client; querying the database based on the request and client specific selection criteria to obtain suitable financial event data results or technical event data results; and transmitting the financial event data results or technical event data results to the client.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

Embodiments of the present invention will now be described, by way of example only, with reference to the attached drawings, wherein.

DETAILED DESCRIPTION

Generally, the present invention provides a method of and a system for providing a financial event identification service.

Existing charting services are able to show oscillators and indicators and allow users to set alerts based on indicators and oscillators. However, this is of marginal trading value due to expected large numbers of false positive trading signals and resultant amounts of human attention and effort required. For example, a single security can typically generate 10 to 20 (and easily more) alerts each month. By contrast, the present invention is able to greatly reduce the amount of human analysis required to study each alert. In addition, the use of the present invention to require that alerts from one type of technical event be confirmed by one or more different technical events will greatly reduce the number of false positives.

Figure 1:
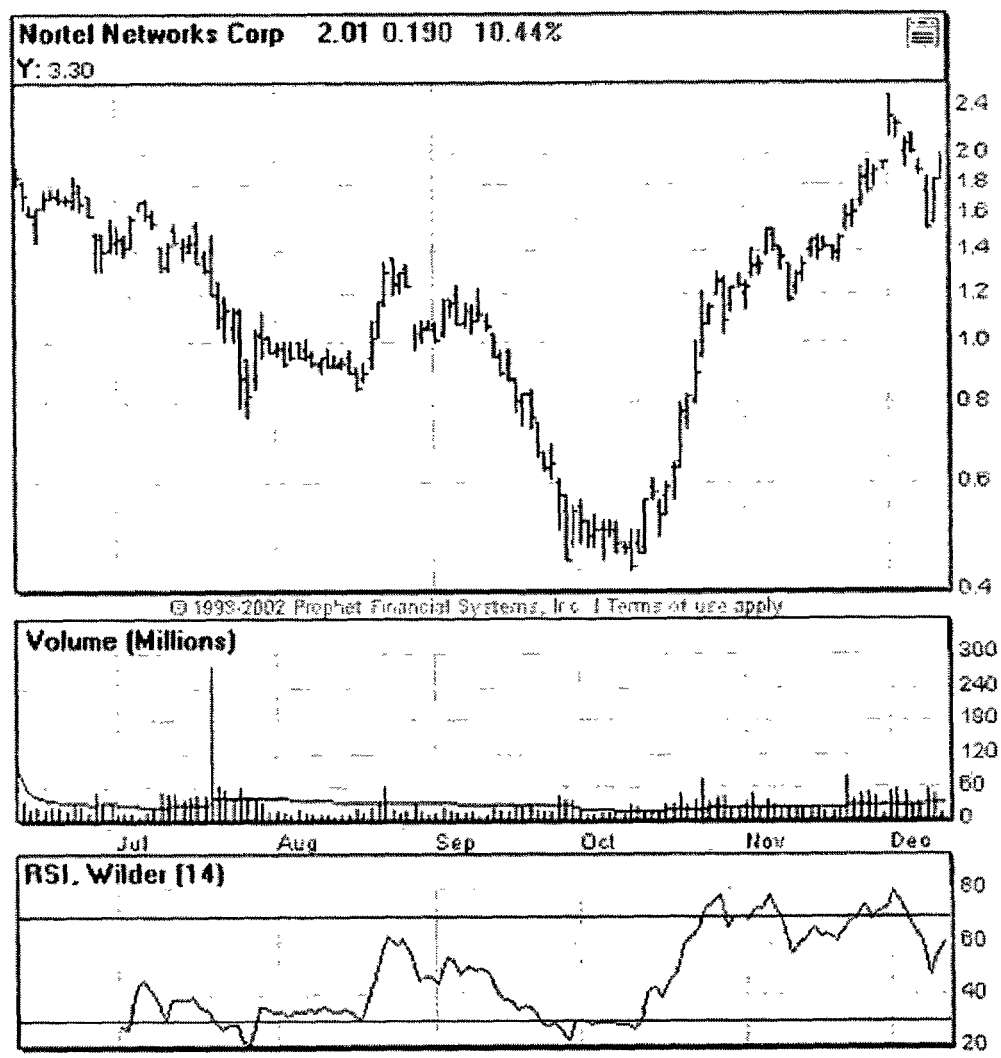
FIG. 1 shows a price chart showing the RSI oscillator in the lower frame.
Figure 2:
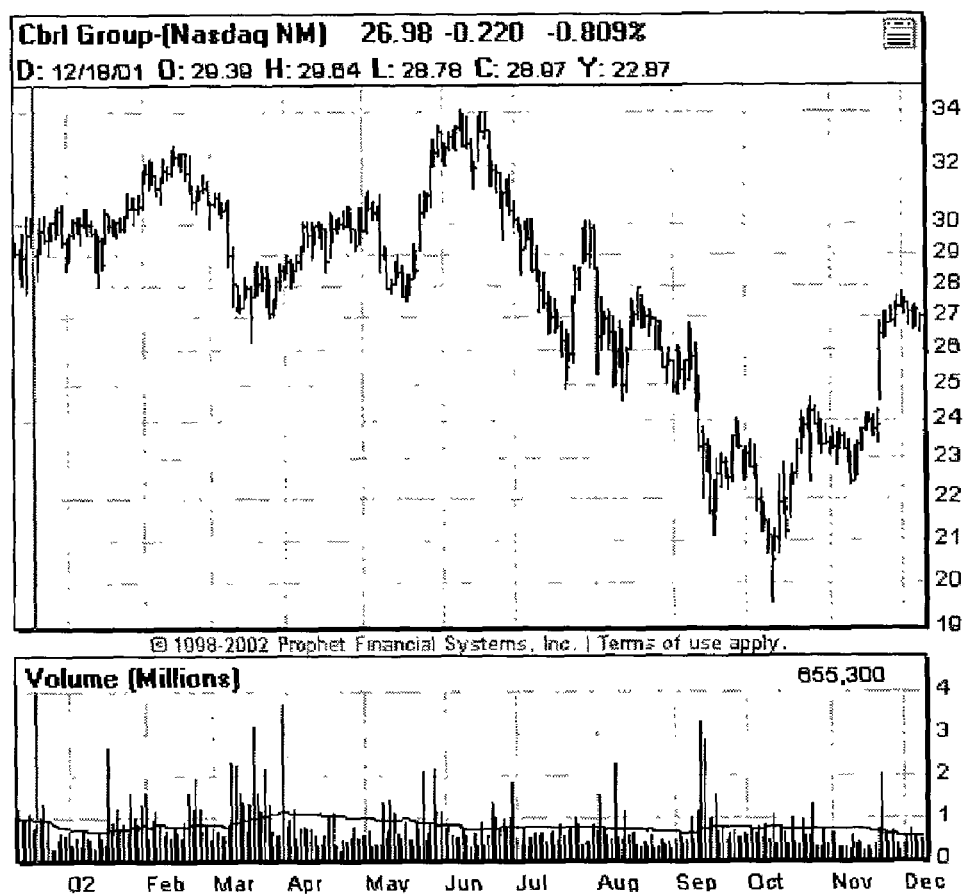
FIG. 2 shows a price chart showing a head and shoulder bottom pattern in the lower right without annotation.
Figure 3:
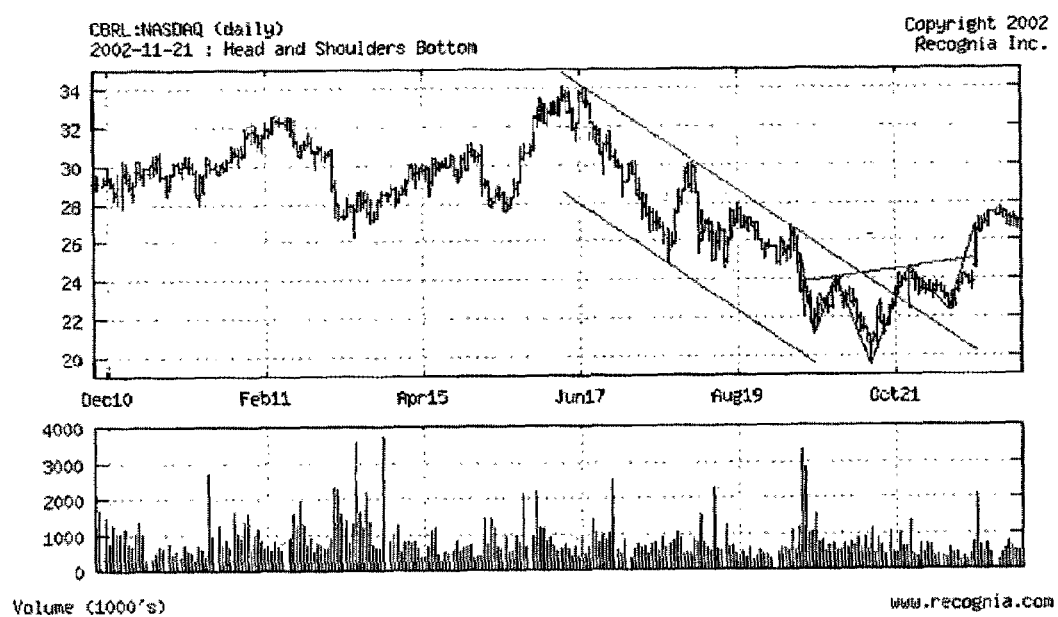
FIG. 3 shows an annotated version of the price chart of FIG. 2.
Figure 4:
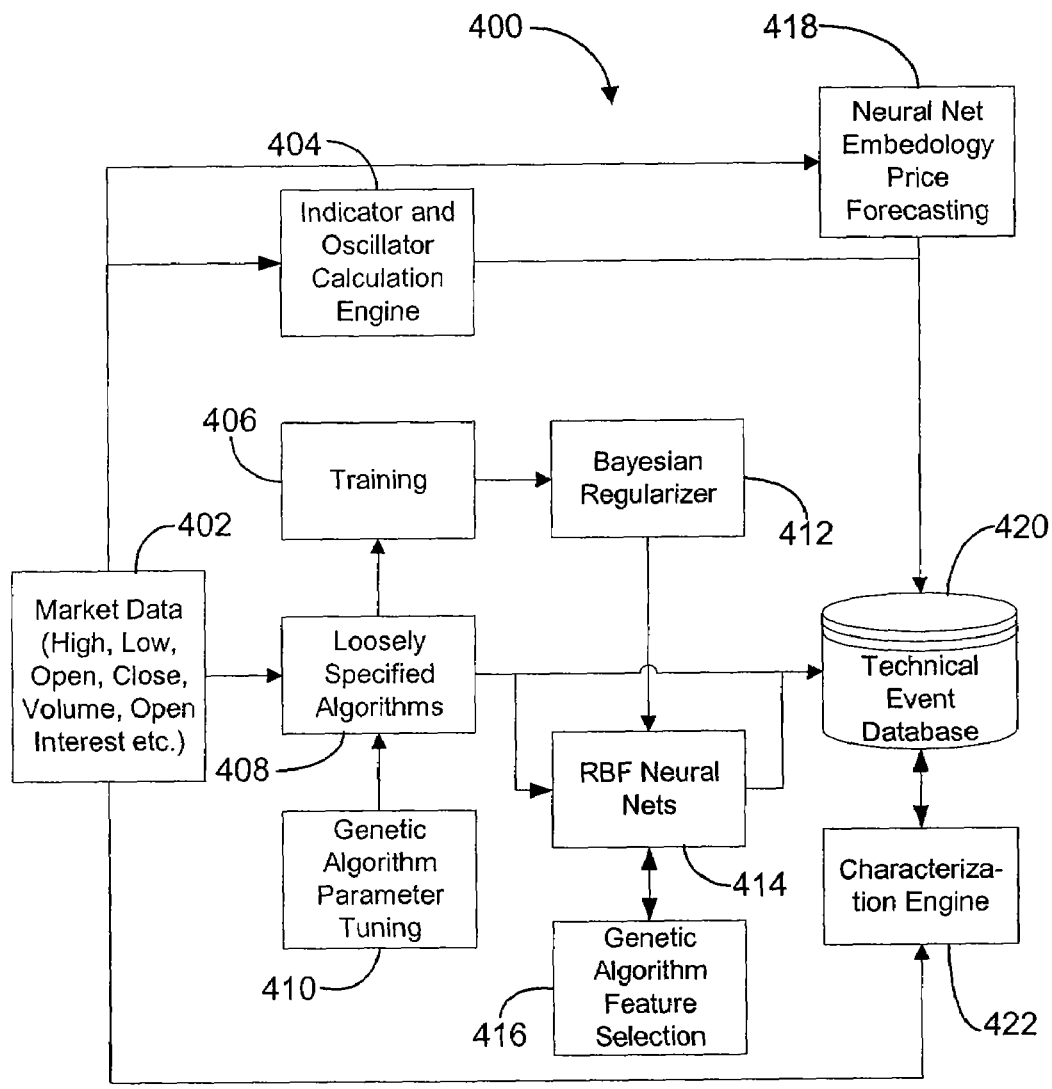
FIG. 4 shows an example system for identifying financial event data and associated characteristics.
Figure 5:
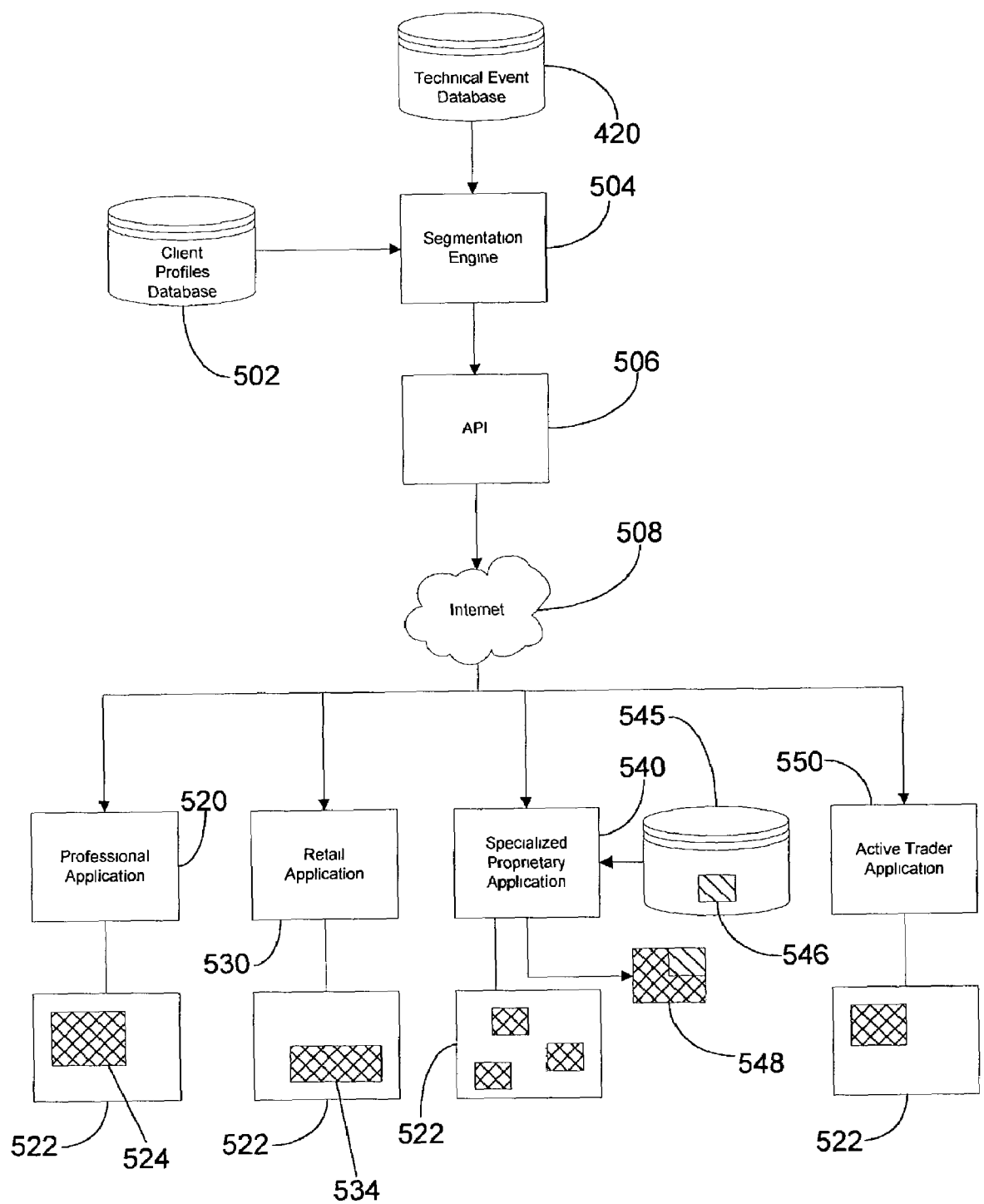
FIG. 5 shows an example system illustrating segmentation of the technical event database.

Referring to FIG. 5, an example system of the present invention includes a technical event database 420. Alternatively, the database can be a financial event database. In an alternative embodiment, the database is a fundamental event database. The database can be the result of a system as illustrated by the example embodiment of FIG. 4. According to an example system 400, market data 402 includes, for example, daily stock market information such as high price, low price, open price, close price, volume, open interest and tick data values for stocks. Market data 402 can be real time data or historical data. Market data 402 is fed to loosely specified algorithms (LSAs) 408 which identify candidate patterns for different window sizes that are written into the database 420 for further analysis. The LSAs 408 also generates chart markup and annotation. Market data 402 is also fed to indicator and oscillator calculation engine 404 and the neural net embedology price forecasting unit 418 and characterization engine 422.

The indicator and oscillator calculation engine 404 computes time series such as simple moving averages and relative strength index (RSI) oscillator values and writes these into the database 420. The neural net embedology price forecasting module 418 gives essentially another characteristic of a pattern. The price forecast indicates what the price is to be expected by time interval forward into the future. Embedology price forecasts are also written to the database 420. Embedology price forecasting produces a series forecast of prices forward in time that are statistically independent of patterns and technical events. This information is compared to the price prediction given by the geometry of the pattern.

The LSAs 408 are tuned by parameter tuning genetic algorithm 410. This is a periodic training activity. Genetic algorithms are used to select and weight the various parameters and rules used by the LSAs 408 to find candidate patterns. Candidate patterns from the LSAs 408 are also used for human ranking, which is a periodic training activity. Candidate patterns are shown to human experts who then rank this information based on their experience. This information is stored in training module 406. The information from the training module 406 is used by the Bayesian regularizer 412. The Bayesian regularizer 412 is a training file that is used to periodically update the RBF neural nets 414. The RBF neural nets 414 receive candidate patterns from the LSAs 408 and the RBF neural nets 414 compute an experiential or consensus rating for each candidate pattern. The experiential rating is equivalent to the rating a human expert would give to the candidate pattern.

The candidate patterns are written to a technical events database 420. These patterns are also stored for later characterization, retrieval and analysis. Feature selection genetic algorithms 416 tune the RBF neural nets 414. This is a training activity that is performed periodically. The indicator and oscillator time series and events are written to database 420. These are technical analysis calculations that are used to identify technical events. An example of a technical event is a closing price moving above its 200 day moving average. Another example is an RSI moving below 70. RBF neural net ratings are also written to database 420. This is a number that indicates how a human expert would rate the candidate pattern. The characterization engine 422 computes various characteristics for every candidate pattern found by the LSAs 408. The characterization engine 422 reads candidate patterns, indicators and oscillators from database 420, computes pattern and event characteristics and write results back to database 420. An example characteristic is the symmetry number. Symmetry is a measure of the similarity of the two halves of a pattern. For example, with a head and shoulder pattern, the symmetry number tells you how balanced the head is and how similar the left and right shoulders are to each other.

A simple pattern, for example a gap, is a pattern which is can be easily and mechanically recognized based on simple criteria. By contrast, a complex pattern (such as a head and shoulders top formation) is one which requires the use of pattern recognition technology, such as the system 400 described above.

Accordingly, the technical event database 420 includes pattern recognition derived technical events, indicator/oscillator derived technical events, simple pattern technical events and the characteristics or properties of each technical event. Characteristics include primary characteristics such as the length, and height of a complex pattern and the pivot points used to establish the pattern candidate and secondary characteristics (derived from the primary characteristics) such as symmetry and experiential rating.

In the present example, the system including the database is maintained by a financial content provider. Clients of the financial content provider can be a direct consumer of its services such as a brokerage firm or retail investor. Alternatively, the client can be a financial service provider or other intermediary which receives data and related information from the financial service provider and provides this information directly or in a modified form to its clients, typically consumers or end users.

Referring to FIG. 5, clients accesses data from the database 420 using an internet, such as the Internet 508. On the client side, each client has a client application 520, 530, 540, 550 which communicates through the Internet 508 with a server side application programming interface (API) 506 for retrieving data from or querying the database 420 through a segmentation engine 504. Segmentation engine 504 uses client profiles database 502 and data fusion algorithms to dynamically identify additional relevant supporting financial events or eliminate irrelevant financial events or otherwise modify the results of the query.

The client application receives requests from users and translates the request to database queries through the API. The results are received by the client application and then formatted and transmitted to the user. The format of the response is formatted, for example into Hypertext Markup Language (HTML) so that it can be interpreted by the user's graphical user interface. The effect is that the user is able to query the database to access a rich source of data enabling the user to identify potential tradable information with confidence.

Referring to FIG. 5, it is desirable to provide different users with suitable information. For example, a professional trader may not wish to receive obvious data relating to obvious patterns which may be considered to be too trivial. Alternatively, the professional trader can suppress receiving information that does not match the trader's investment style. For example, if the trader focuses on trades within a short time frame then trading opportunities having a longer time frame are unsuitable. By contrast, a retail trader may prefer to invest based on a longer time frame and may prefer to trade based on patterns which are clearer. For example, the retail trader may prefer only to rely on pattern candidates having high symmetry or a relatively flat neckline in a head and shoulders formation.

Another important aspect is the regulatory requirement that trading signals not be given to retail traders whereas professional traders can be very interested in a strong trading signal (consisting of a stock, a price movement and a confidence rating). To that end, clients can use different client applications depending on the features and information they wish to use. In the example of FIG. 5, four different clients are represented, each client having a different client application 520, 530, 540, 550.

More importantly, the segmentation engine 504 is used to present suitable data to each client based on information stored in the client profiles database 502 and data fusion algorithms that dynamically identify additional relevant supporting financial events or eliminate irrelevant financial events or otherwise modify the results of the query. Reference 522 denotes all of the data available in the database or all of the data available regarding a particular type of query. The segmentation engine is used to selectively make subsets of the data available to each client application in responding to user requests. For example, the professional application 520 only sees data 524, a subset of data 522. Accordingly, all requests will be based on this subset. For example, if a professional trader were interested only in asymmetrical complex patterns (represented by 524) then all other complex patterns would not be presented. Similarly, a retail client will be presented a different subset 534 of data 522 which the retail application 530 will manipulate or analyze. Note that there is no predetermined relationship between data 524 and data 534. They can be overlapping (having some common data), disjoint or one can be a subset of the other.

The use of client applications allows custom delivery or presentation of suitable or relevant information. However, another aspect of the present invention is illustrated by the example of the specialized proprietary application 540 which uses data held external the system 400. Segmentation engine 504 uses a corresponding entry in client profile database 502 and data fusion algorithms to only present to specialized proprietary application 540 the data 542. (External) data 546 also available to specialized proprietary application 540 so that specialized proprietary application 540 operates on the union of these two sets which is illustrated as data 548.

Figure 6:
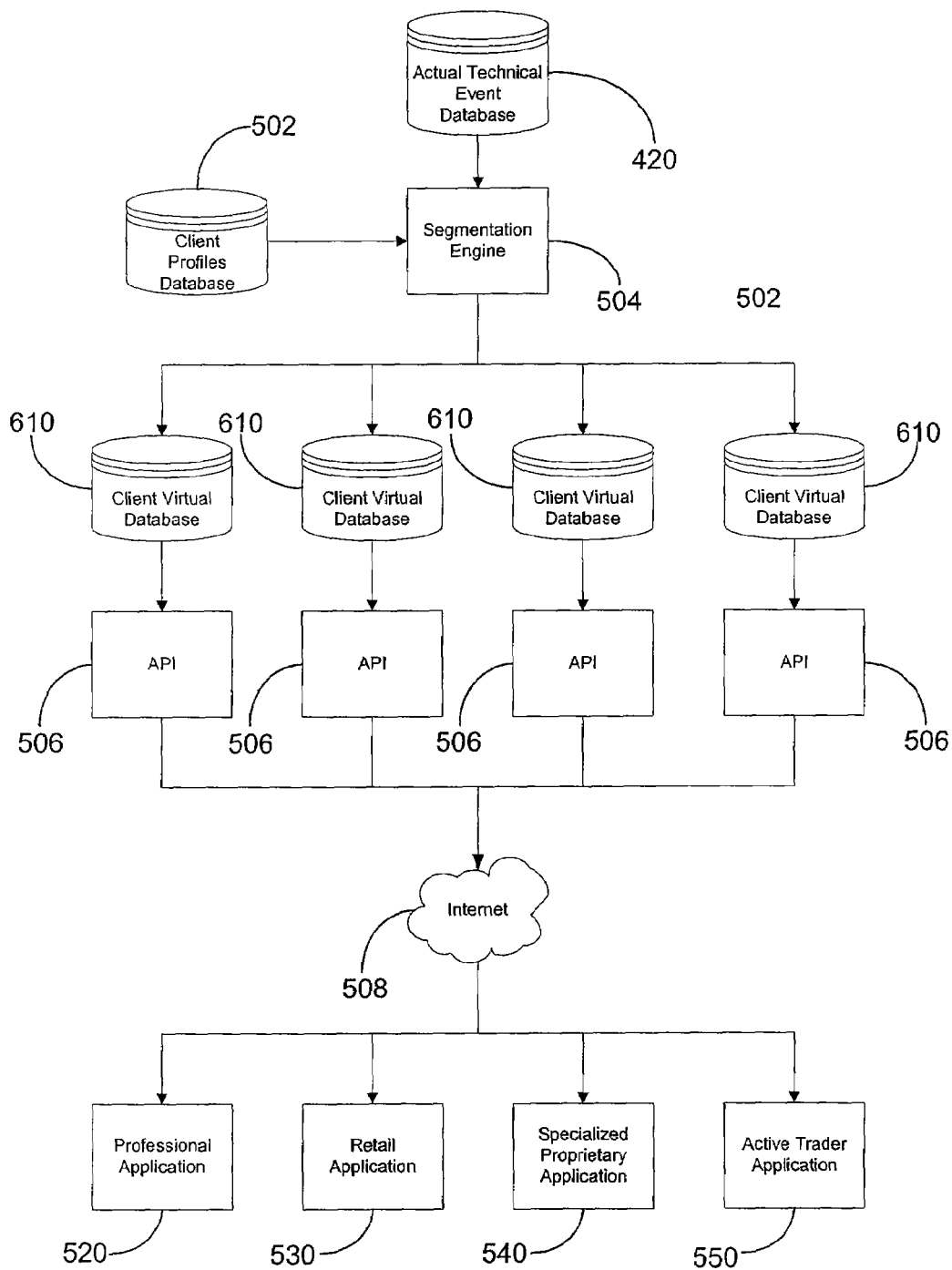
FIG. 6 illustrates a series of client virtual databases and corresponding client applications.

Referring to FIG. 6, the system can be conceptually represented by individual virtual data structures 610 corresponding to each client. To each client, the API 506 appears to be interacting with the client's corresponding virtual data structure 610 rather than the actual database 420.

Figure 7:
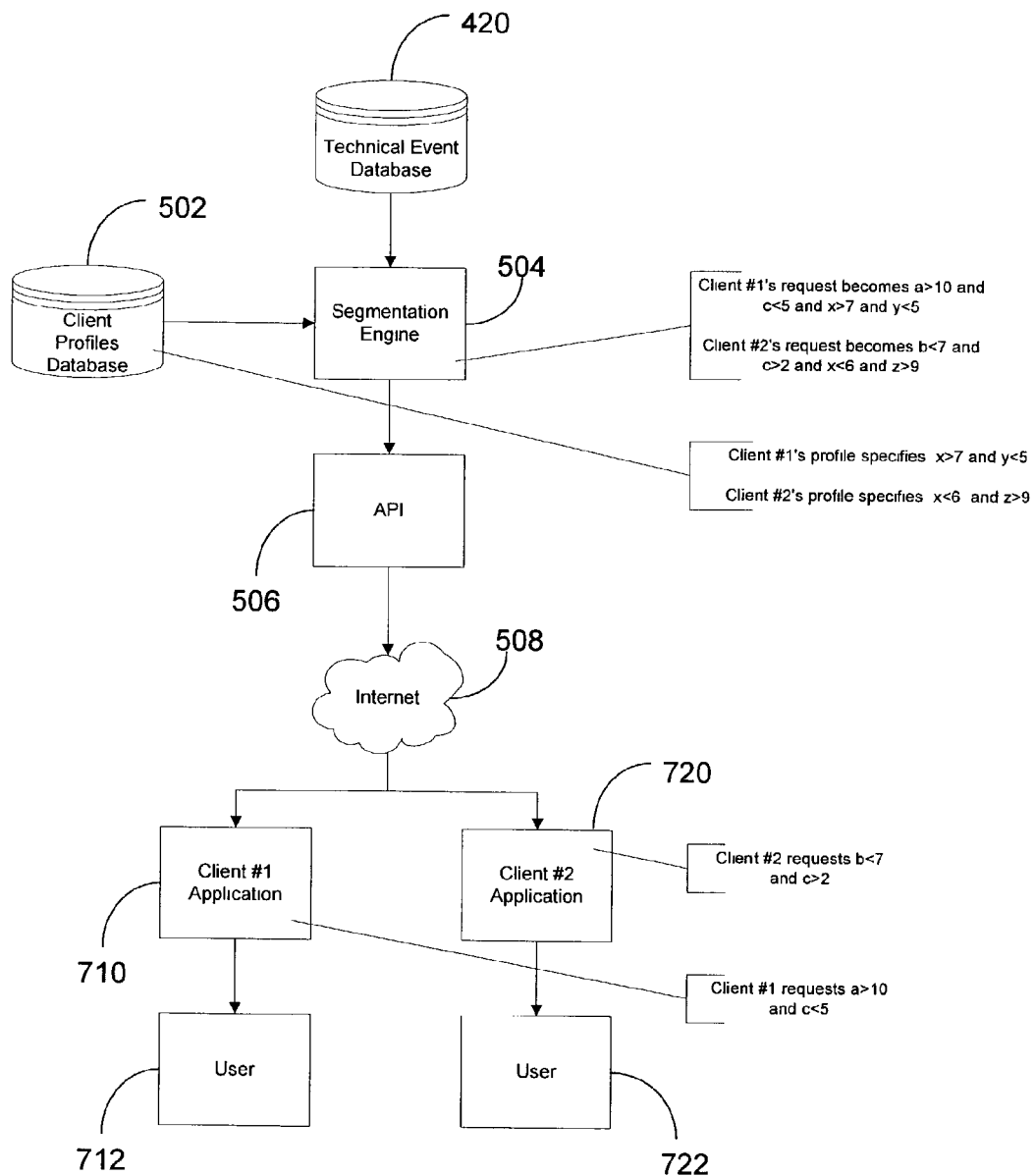
FIG. 7 illustrates example queries by users.

Referring to FIG. 7, the relation between client applications and the client profile database is illustrated in greater detail. In the client profiles database client 1 has a profile which specifies that quantities x and y must satisfy: $x>7$ and $y<5$. Similarly client 2 has a profile which specifies that $x<6$ and $z>9$. At the client application level, a request is made, for example by user 712, for data satisfying the conditions $a>10$ and $c<5$. At the segmentation engine 504 or module, this translates to the request for data from database 420 satisfying the criterion: $a>10$ and $c<5$ and $x>7$ and $y<5$. Similarly, a request by user 722 for data satisfying $b<7$ and $c>2$ results in the segmentation engine querying database 420 for data satisfying the criterion: $b<7$ and $c>2$ and $x<6$ and $z>9$.

Figure 8:
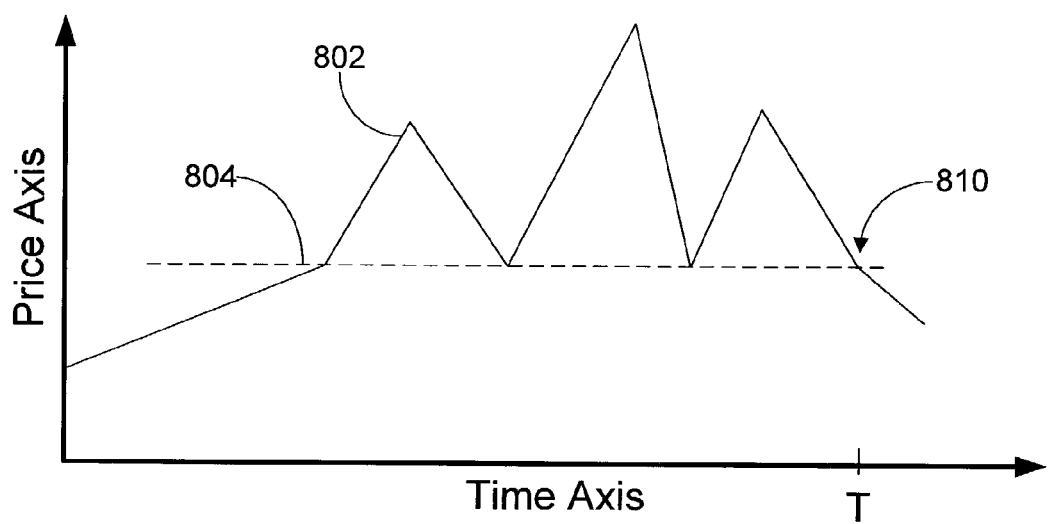
FIG. 8 illustrates a head and shoulder top pattern and an associated technical event.
Figure 9:
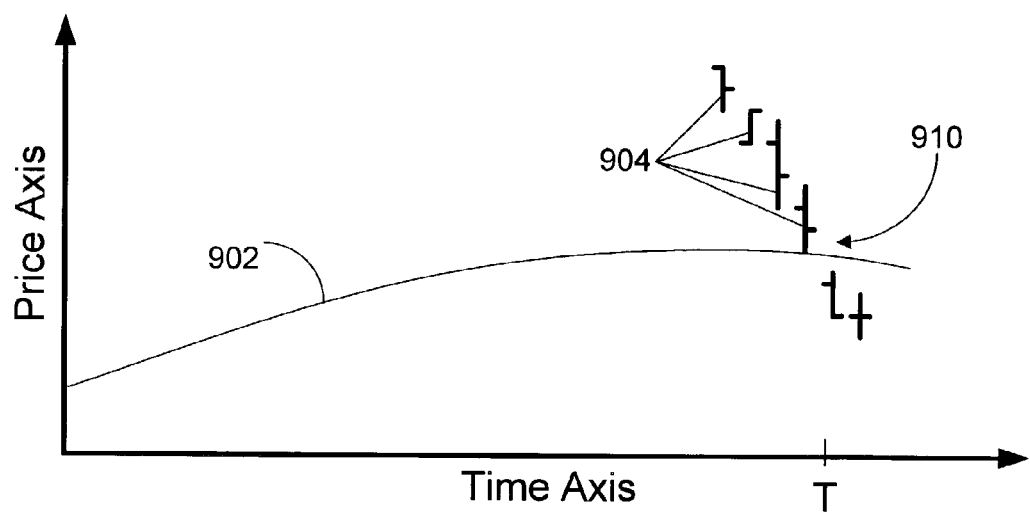
FIG. 9 illustrates a moving average technical event.
Figure 10:
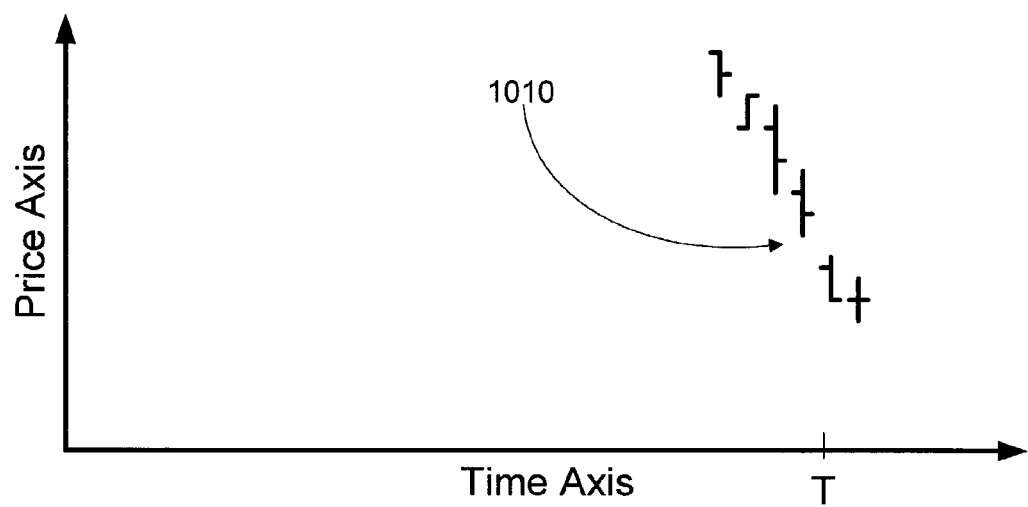
FIG. 10 illustrates a down gap technical event.
Figure 11:
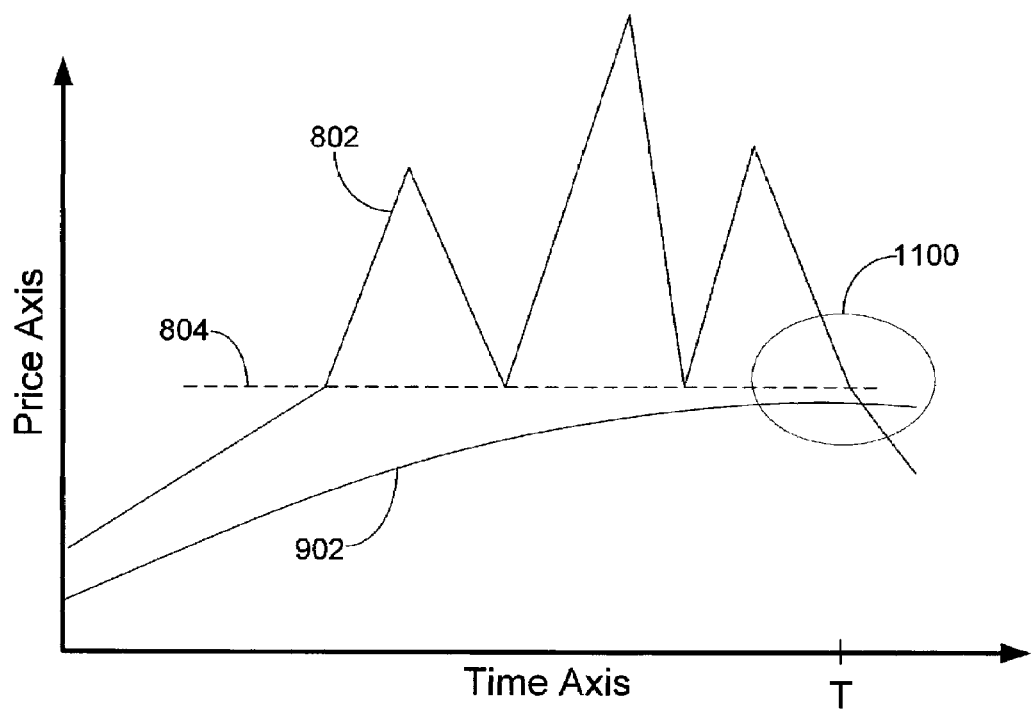
FIG. 11 illustrates the coincidence of the technical events of FIGS. 8, 9 and 10.
Figure 12:
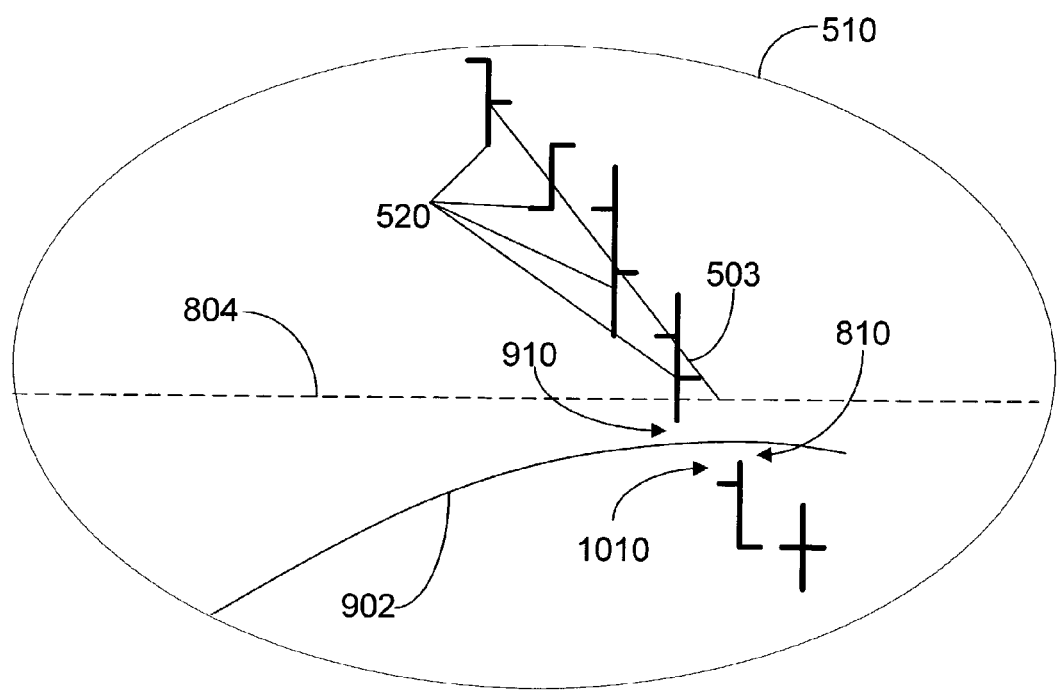
FIG. 12 shows detail of the coincidence shown in FIG. 11.

The availability of technical and fundamental events in database 420 facilitates functionality and provides advantages based on coincident financial events. FIG. 8 illustrates a head and shoulders top formation having pattern neckline 804. A technical event 810 occurs when the formation 802 crosses the neckline 804. Specifically, the price closes below the neckline which confirms the head and shoulders top formation. In a conventional system, the chart is available, however, the critical identification of technical event 810 is not made. FIG. 9 is a chart illustrating 200 day moving average 902. Standard high, low, open close price bars 904 are also shown. Technical event 910 occurs when the price crosses below the 200 day moving average. FIG. 10 illustrates a series of price bars forming a gap pattern with the technical event 1010 occurring when the price gaps down. Although each of these fundamental and technical events can be of interest to an investor, it is identification of the coincidence of these financial events that is especially valuable. The present system is able to identify and display such events, for example, by the user of a superposition of charts as illustrated in FIG. 11. The area of interest 1100 is illustrated in detail in FIG. 12 in which it is clear that technical events 810, 910 and 1010 coincide in the vicinity where the edge of right shoulder 503 meets pattern neckline 804.

Such coincidences or correspondences can be easily found by a request made to the database 420 specifying that technical events occur at the same time T. The availability of different technical events also improves the quality of search for useful or "tradable information", especially when the tedious aspects of searching and technical analysis can be automated. For example, if a complex pattern or formation has taken 60 days to form then it is more appropriate to examine a 100 day moving average than a five day moving average. The client application of the present invention can suggest and implement suitable companion charts and search for confirmatory technical; events. In addition, the geometry of the pattern indicates price targets which also influence the selection of indicator and oscillator derived technical events.

The use of different client side applications corresponding to each client allows true customization by modifying the application. By contrast, in a conventional system, the same information is presented to all clients with, at best, rudimentary modification of a limited number of features available, for example, by selection from a menu of choices.

Figure 13:
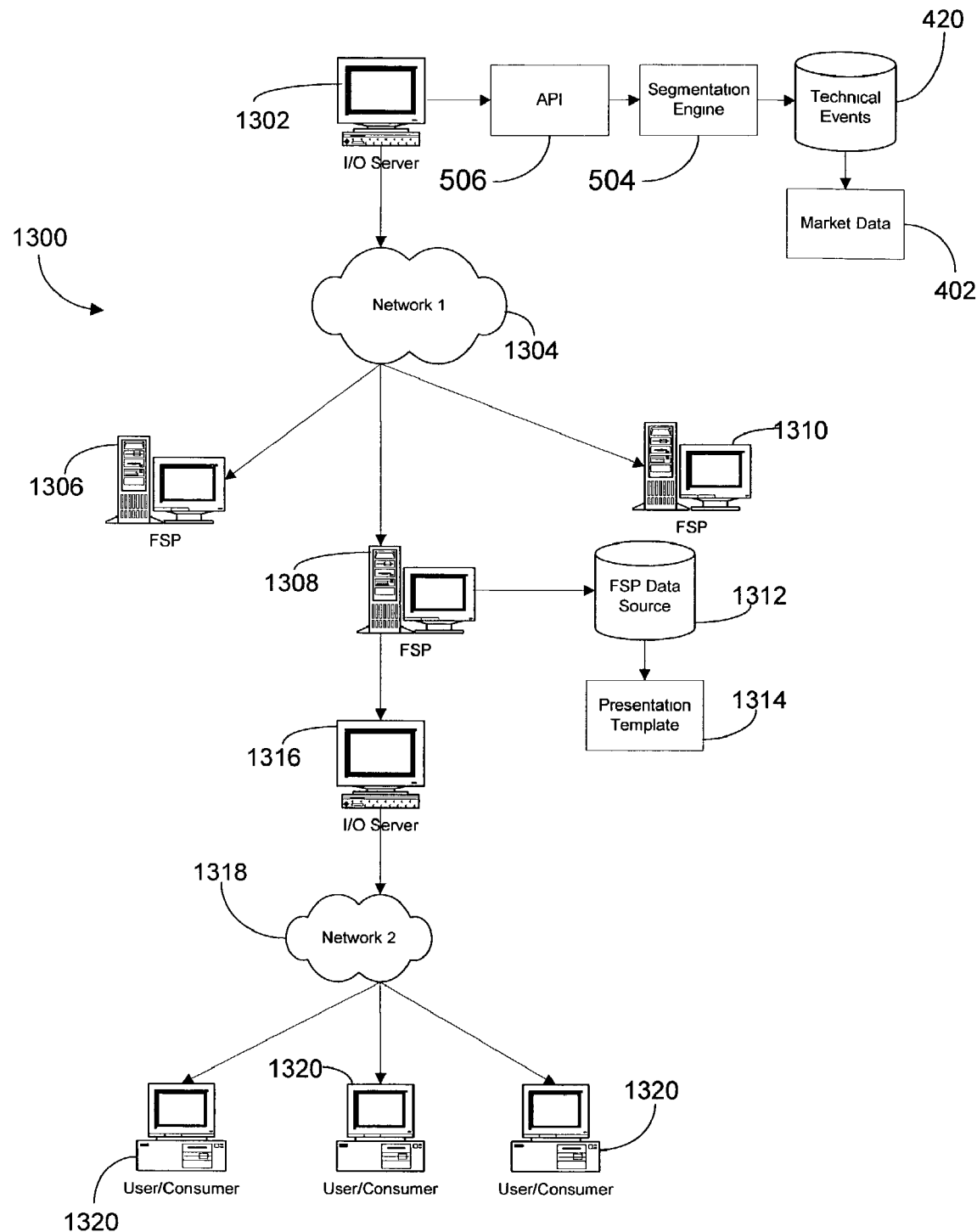
FIG. 13 shows an example system according to the present invention.

FIG. 13 illustrates an example system 1300 according to the present invention in which a financial content provider maintains the technical events database 420. Clients such as financial service providers 1306, 1308, 1310 can use client applications (not shown) to access the database over a network 1304 such as the Internet and I/O server 1302. The client 1308 has a database or data source 1312 and presentation template 1314. Users 1320 can access the client's system via network 1318, for example a wireless network, and I/O server 1316.

Figure 14:
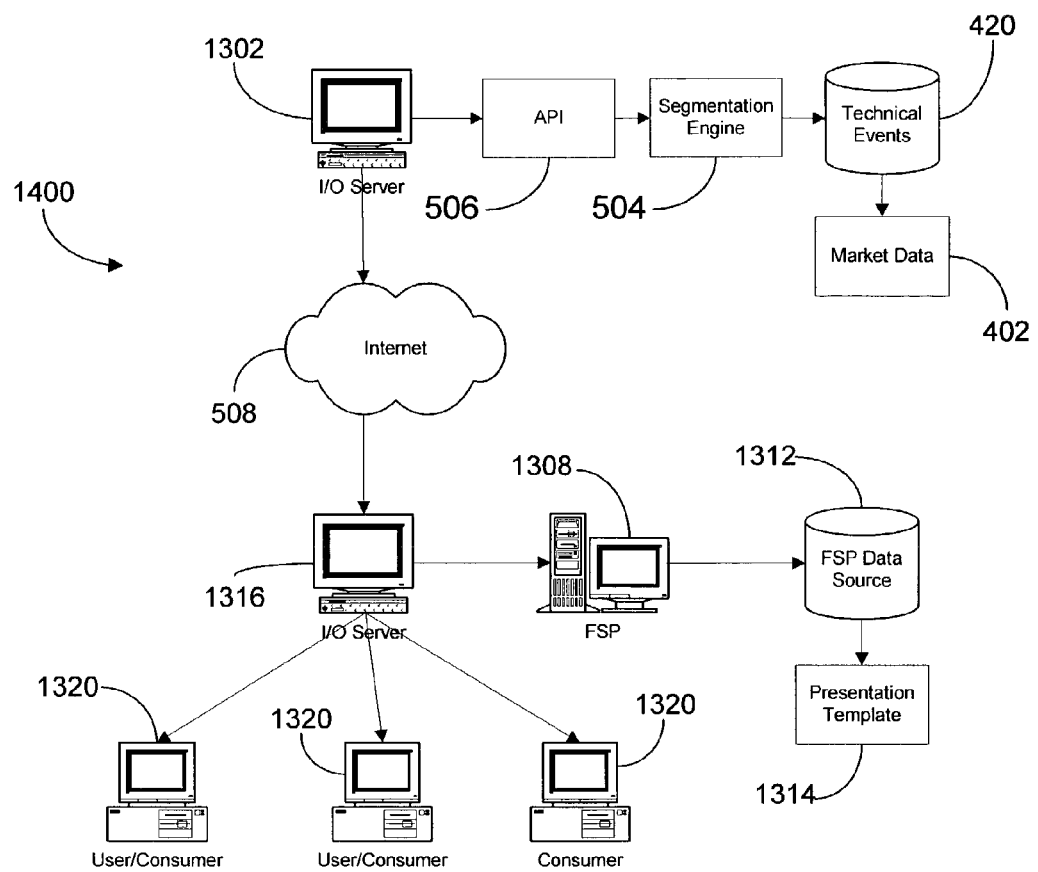
FIG. 14 shows another example system according to the present invention.

FIG. 14 shows an alternative embodiment of the present invention with a different system configuration using a single network such as the Internet. Thus the networks 1304, 1318 of the embodiment of FIG. 13 are replaced by a single network or an internet, such as the Internet 508. Referring to FIG. 14, another example system 1400 also includes a technical events database 420 maintained by a financial content provider. A financial service provider 1308 using a client application (not shown) can access the database 420 via a network such as the Internet 508. Users 1320 can access request technical event related information by accessing a client application through I/O server 1316.

Client applications according to the present invention can be deployed over the Internet to financially oriented web sites and online brokers and internally within trading institutions. Users 1320 interact with the applications through web sites operated by financial content providers who private label the applications, thus adding content value to their site with minimal cost and effort.

The present invention is capable of a product offering richer than traditional services and tools since it enables pattern annotations. By contrast, a neural net only approach is limited because the basic characteristics and pivot points of the patterns are not known. This richer pattern recognition functionality enables financial services providers to better tailor the presentation of its offering to the sophistication of its users.

The offering of private-label financial event analytics is unique to the present invention. The present invention allows a deeper and more sophisticated functionality and a deployment model that can simultaneously serve large numbers of sites.

The present invention allows the automation of chart pattern recognition, and more broadly technical and fundamental event recognition, in such a way that it could be deployed by any financial site on the Internet. Automated technical event recognition is a very desirable tool of interest to virtually all financially oriented web sites however, its development involves complex mathematical and computing techniques and requires significant domain knowledge and expertise. Most of these resources lie outside the scope of the average online site's expertise and day-to-day operations.

An aspect of the present invention is a substantial historical database of information relating to the behaviour of technical events in the financial markets. This database allows researchers and serious investors to study chart behaviour in a manner that has previously been unavailable. The database also provides historical context and past performance information to facilitate improved chart pattern recognition and access to related information.

The pattern recognition and forecasting technology is being used to scan data feeds from all the North American stock and commodities exchanges and to detect technical events. The recognition engine uses a number of substantially statistically independent techniques that are fused to provide a series of ratings for each pattern. The technical events, their ratings and specific characteristics are stored in suitable data structures such as an IBM DB2 database.

The application and the database can be accessed using a sophisticated web-based XML API. The variation of calls and their complexity are almost endless. The API can return data in XML (including, for example, RSS, ICE and SOAP) and HTML formats. These formats provide flexibility and allow multiple uses of the information.

Furthermore, an analysis of the patterns in the pattern database suggests there are other measures that are more important in selecting profitable pattern trading opportunities. The flexible search and sort delivery mechanisms of the present invention will allow users to "pull", or to search for and select, patterns based on the criteria they deem important. This is in contrast to the "one size fits all" approach where fixed delivery mechanisms are "pushed" to the user.

The pattern database of the present invention typically contains millions of patterns that can be used for real time analysis, and research and development of trading strategies. This is in contrast to conventional offerings available at existing financial web sites which offer a limited selection of current patterns but do not allow users to perform analysis based on historical data.

The present invention permits the promotion of a database of trading patterns and the promotion of its use as an investment research tool. This information has not previously been available because the ability to automatically monitor all securities and exchanges for technical and fundamental events has not existed.

As an example of the value of this data, preliminary analysis indicates that a leading indicator of market performance can be computed by simply considering the ratio of the number of top patterns versus the number of bottom patterns. This computed value potentially leads the market. This is referred to as the Recognia Index. In addition, the use of technology to characterize the individual patterns to a level that has not been previously attempted enables financial content providers to enjoy back testing services for patterns thus estimating the profit potential and risk associated with each.

Referring to FIG. 13, according to a method of the present invention, a hosted application is licensed by a financial content receiver or financial service provider who can label it to suit its business. We refer to this as private-label branding. In older technologies, this model would be analogous to an OEM model where the licensed technology is embedded in the customer's product offering. This means that the task of pulling in users and maintaining a web site generally falls on the financial content receiver's shoulders rather than the financial content provider's. Yet at the same time, brand awareness of the financial content provider's technology is promoted. Effectively, the financial content provider and the financial content receiver such as a financial service provider, out-source and leverage each other's strengths. This allows financial service providers to focus on their core competency and allows the financial content provider to focus on research and technology development.

Accordingly, the financial content provider accesses historical and real time market data, including for example intraday, end-of-day, weekly and monthly data, for analysis thereof for recognition of chart patterns and other technical and fundamental events. These results are provided to a financial content receiver such as a financial services provider for modification and re-labelling so that the financial services provider's users will find the information useful. The financial content provider and the financial services provider can also be responsive to downstream requests and preferences and modify the information transmitted according. It is also contemplated within the scope of the present invention to target the wireless market as consumers move into this arena. The task of implementing and promoting the wireless service again lies with customers—the financial content provider simply provides the material that helps draw users to their sites.

Referring to the Figures, a method of providing a technical event identification service comprises:
identifying technical and fundamental events;
determining characteristics (or properties) associated with each technical and fundamental event;
storing the technical and fundamental events and associated characteristics in a database;
receiving a request for data relating to one or more technical or fundamental events from a client;
providing technical and fundamental events and associated characteristics based on predetermined criteria for the client in response to the client request manipulating the received data; and
presenting the information using a graphical user interface (GUI).

Another method of providing a financial event identification service comprises:
accessing historical data;
accessing real time data;
analyzing the historical and real time data for recognition of chart patterns;
analyzing the historical market data and current market data for fundamental events;
interpreting recognized chart patterns for determination of technical events; and
providing the financial events to the financial content receiver for customization and private labelling thereof.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of providing modified financial event data through a financial event identification service, comprising: identifying complex patterns within stock market data; generating a database of financial event data, the financial event data comprising fundamental events and technical events, a technical event locating the time period when an oscillator has crossed a threshold, or when a stock price has interacted with an indicator or confirmed the existence of a previously-identified complex pattern, and a fundamental event locating the time period when a stock price has interacted with a price value computed from at least one of company accounting and other economic data; making available to a client a subset of the financial event data based on a client profile and client application specific selection criteria; receiving from the client an identification of a pattern of interest from within the identified complex patterns, and a request for financial event data related to the pattern of interest; querying the subset to identify the financial event data related to the pattern of interest; dynamically modifying via a computer, the identified financial event data in accordance with other financial event data substantially coincident with the identified financial event data; superposing the modified financial event data on the pattern of interest; and displaying the pattern of interest with the superposed financial event data to the client.

2. The method of claim 1, wherein the client is a financial service provider.

3. The method of claim 1, wherein the client is an end user.

4. The method of claim 1, further comprising formatting the modified financial event data in a format suitable for transmission to the client.

5. The method of claim 4, wherein formatting the modified financial event data in a format suitable for transmission to the client comprises formatting the modified financial event data into one of HTML, XML and SOAP.

6. The method according to claim 1, wherein dynamically modifying the identified financial event data comprises identifying an additional relevant financial event and incorporating the additional relevant financial event into the identified financial event data.

7. The method according to claim 1, wherein dynamically modifying the identified financial event data comprises identifying an irrelevant financial event and eliminating the irrelevant financial event from the identified financial event data.

8. The method according to claim 1, wherein generating a database of financial event data comprises identifying a simple pattern financial event.

9. The method according to claim 1, wherein generating a database of financial event data comprises identifying a pattern recognition derived financial event.

10. The method according to claim 1, wherein generating a database of financial event data comprises computation of a time series.

11. The method according to claim 1, wherein generating a database of financial event data comprises computation of a price forecast.

12. The method according to claim 1, wherein identifying predetermined patterns within the market data is accomplished by applying a loosely specified algorithm (LSA) to the market data.

13. The method according to claim 1, wherein the complex patterns are reversal patterns.

14. The method according to claim 13, wherein the reversal patterns comprise double top, head and shoulders top, double bottom, or head and shoulders bottom reversal patterns.

15. The method according to claim 1, wherein the complex patterns are asymmetrical complex patterns.

16. The method according to claim 1, wherein the oscillator is a relative strength index oscillator.

17. The method according to claim 1, wherein the indicator is a moving average.

18. A system for providing modified financial event data through a financial event identification service, the system comprising:
 means for identifying complex patterns within stock market data;
 means for generating a database of financial event data, the financial event data comprising fundamental events and technical events, a technical event locating the time period when an oscillator has crossed a threshold, or when a stock price has interacted with an indicator or confirmed the existence of a previously-identified complex pattern, and a fundamental event locating the time period when a stock price has interacted with a price value computed from at least one of company accounting and other economic data;
 means for making available to a client a subset of the financial event data based on a client profile and client application specific selection criteria;
 means for receiving from the client an identification of a pattern of interest from within the identified complex patterns, and a request for financial event data related to the pattern of interest;
 means for querying the subset to identify the financial event data related to, or substantially coincident with, the pattern of interest;
 means for dynamically modifying the identified financial event data in accordance with other financial event data substantially coincident with the identified financial event data;
 means for superposing the modified financial event data on the pattern of interest; and
 means for displaying the pattern of interest with the superposed financial event data to the client.

* * * * *